United States Patent
Novin et al.

(10) Patent No.: US 6,182,330 B1
(45) Date of Patent: Feb. 6, 2001

(54) SELF-LATCHING HINGE

(75) Inventors: Eugene Novin, Ambler; David A. Lowry, Wayne, both of PA (US)

(73) Assignee: CEMA Technologies, Inc., Bridgeport, PA (US)

( * ) Notice: Under 35 U.S.C. 154(b), the term of this patent shall be extended for 0 days.

(21) Appl. No.: 09/196,682

(22) Filed: Nov. 20, 1998

Related U.S. Application Data

(60) Provisional application No. 60/066,208, filed on Nov. 20, 1997.

(51) Int. Cl.[7] ............................................. E05D 11/10
(52) U.S. Cl. ........................ 16/341; 16/334; 16/308; 16/297
(58) Field of Search ..................... 16/342, 341, 337, 16/330, 329, 354, 334, 319, 297, 308; 361/683, 727, 740, 741, 610, 681; 364/708, 708.1; 403/83, 84, 93, 95, 103

(56) References Cited

U.S. PATENT DOCUMENTS

| | | |
|---|---|---|
| 301,164 | 7/1884 | Robson et al. . |
| 1,166,551 | 1/1916 | Simmons . |
| 2,504,351 | 4/1950 | Ring . |
| 2,516,935 * | 8/1950 | Weaver .................................. 16/308 |
| 4,536,918 * | 8/1985 | Brochaus ............................... 16/308 |
| 4,817,240 * | 4/1989 | Sovis ...................................... 16/297 |
| 5,052,078 | 10/1991 | Hosoi . |
| 5,075,929 | 12/1991 | Chung . |
| 5,088,156 | 2/1992 | Hosoi . |
| 5,109,572 * | 5/1992 | Park ......................................... 16/334 |
| 5,131,779 | 7/1992 | Sen . |
| 5,165,509 | 11/1992 | Kanno et al. . |
| 5,276,945 | 1/1994 | Matsumura . |
| 5,333,356 | 8/1994 | Katagiri . |
| 5,491,874 | 2/1996 | Lowry et al. . |
| 5,818,360 * | 10/1998 | Chu et al. ............................... 341/22 |

* cited by examiner

*Primary Examiner*—Anthony Knight
*Assistant Examiner*—Mark Williams
(74) *Attorney, Agent, or Firm*—Akin, Gump, Strauss, Hauer & Feld, L.L.P.

(57) ABSTRACT

A self-latching hinge for rotatably coupling a first member to a second member is provided. The hinge comprises a hinge housing connected to one of the first and second members. A shaft is rotatably disposed in the hinge housing, with the shaft being connected to the other of the first and second members. A cam is located on the shaft. A rotatable roller is located in the housing adjacent to the cam such that as the shaft is rotated, the cam contacts and rotates the roller. Contact between the roller and the cam at a specified angle of rotation causes interference between the roller and the cam to create an increased latching torque which must be overcome for movement of the shaft. A portable computer is also provided having a self-latching hinge located between the display housing and the processor housing.

15 Claims, 4 Drawing Sheets

SELF-LATCHING HINGE

CROSS REFERENCE TO RELATED APPLICATIONS

This application claims the benefit of U.S. Provisional Application Ser. No. 60/066,208, filed Nov. 20, 1997.

BACKGROUND OF THE INVENTION

The present invention relates to a hinge assembly for rotatably coupling first and second members together, and more particularly, to a position holding, self-latching hinge for holding first and second members at any specified angle of rotation relative to each other and which provides an additional latching force at a specified angle of rotation.

In certain hinge applications, it is often desirable to control the angular position of a first member which is rotatably coupled to a second member by using the hinge itself for both rotatable coupling and positional control. One such application is for the field of laptop, notebook and palmtop computers in order to allow a user to rotatably position the liquid crystal display screen at a selected ergonomic viewing angle.

In a notebook computer, the liquid crystal display is typically connected to one side of a friction hinge assembly and the base of the computer is connected to the other side. The display is held in any angular position by frictional torque generated by the hinge. One preferred hinge arrangement is disclosed in U.S. Pat. No. 5,491,874, which is assigned to the assignee of the present application and which is incorporated herein by reference as if fully set forth.

The presently known notebook computers generally include some form of latching mechanism. For example, a pair of latching mechanisms 11 can be located at the sides of the display 17, as shown in FIG. 1, or a single latching mechanism 14 can be located at the top of the display 17, as shown in FIG. 2. These latching mechanisms are required in order to maintain a minimum gap between the display 17 and the processor housing 18 of the computer 10 at all times during storage and transportation to prevent inadvertent opening of the display 17. When the computer display 17 is rotated downwardly to the closed position, as shown in FIGS. 3 and 4, either the pair of side latching elements 11 are engaged in receiving slots 12 shown in FIG. 1, or the front latching element 18 is engaged in the receiving slot 15 shown in FIG. 2. In order to open the computer display 17, the user must either slide both latching elements 11 toward the front or rear of the computer while rotating the display counterclockwise, as indicated in FIG. 3, or unlatch the latching mechanism 18 by pressing downwardly or inwardly to release the mechanism 18 while rotating the display upwardly, as shown in FIG. 4. In both cases, the user must actuate one or more latching mechanisms prior to opening the display.

One problem with the known latches is that they are easily broken and have a relatively short life. This often means that broken latches must be replaced by the manufacturer or the purchaser one or more times during the notebook computer's life. Additionally, due to the larger size display screens which are becoming available for computers, it would be desirable to eliminate the need for latches either at the sides or center of the display in order to utilize that space for a larger display without the need for increasing the overall size of the computer housing. Additionally, it would be beneficial to decrease the complexity and cost of the display bezel by eliminating the need for separate latch mechanisms altogether.

SUMMARY OF THE INVENTION

Briefly stated, the present invention provides a self-latching hinge for rotatably coupling a first member to a second member. The hinge comprises a hinge housing connected to one of the first and second members. A shaft is rotatably disposed in the hinge housing, with the shaft being connected to the other of the first and second members. A cam is located on the shaft. A rotatable roller is located in the housing adjacent to the cam such that as the shaft is rotated, the cam contacts and rotates the roller. Contact between the roller and the cam at a specified angle of rotation causes interference between the roller and the cam to create an increased latching torque which must be overcome for movement of the shaft.

In another aspect, the present invention provides a self-latching hinge for rotatably coupling a first member to a second member. The hinge comprises a hinge housing connected to the first member and a shaft rotatably disposed in the hinge housing. The shaft is connected to the second member. A cam is located on the shaft, and the cam includes an outer surface having a plurality of projections. A rotatable roller is located in the hinge housing such that as the shaft is rotated the cam contacts and rotates the roller. Contact between the roller and the cam at a specified angle of rotation causes interference between the roller and at least one of the plurality of projections on the cam to create an increased latching torque which must be overcome for movement of the shaft.

In another aspect, the present invention provides a portable computer which includes a display housing, a processor housing, and a hinge pivotably connecting the display housing to the processor housing. The hinge includes a hinge housing connected to one of the processor housing and the display housing. A shaft is rotatably disposed in the hinge housing. The shaft is connected to the other of the processor housing and the display housing. A frictional torque applying element is located in the housing for applying frictional torque to the shaft as the shaft is rotated. A cam is located on the shaft. A rotatable roller is located in the housing such that as the shaft is rotated the cam contacts and rotates the roller. Contact between the roller and the cam at a specified angle of rotation causes interference between the roller and the cam to create an increased latching torque which must be overcome for movement of the shaft.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
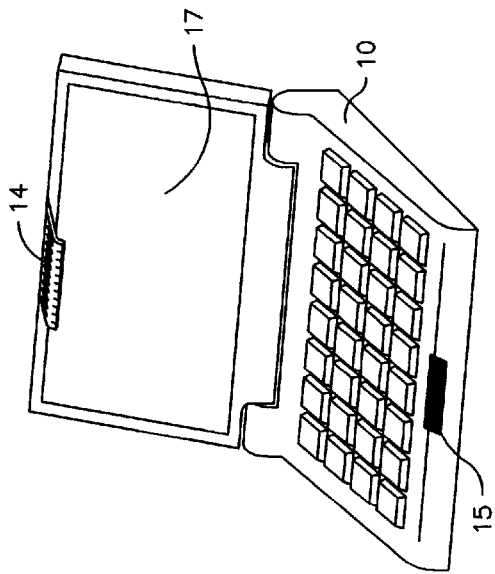
FIG. 1 is a perspective view of a prior art notebook computer having latching mechanisms located on each side of the display housing.
Figure 3:
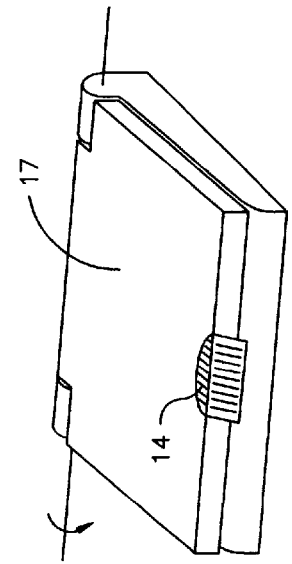
FIG. 3 is a perspective view of the prior art notebook computer of FIG. 1 showing the display housing in the closed position.
Figure 2:
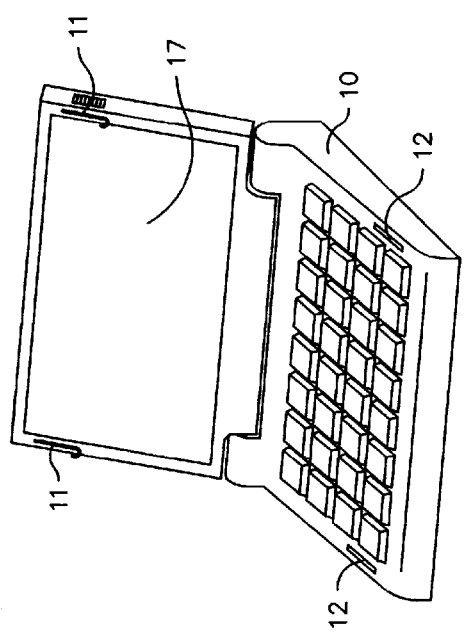
FIG. 2 is a perspective view of a prior art notebook computer having a latching mechanism located at the top of the display housing.
Figure 4:
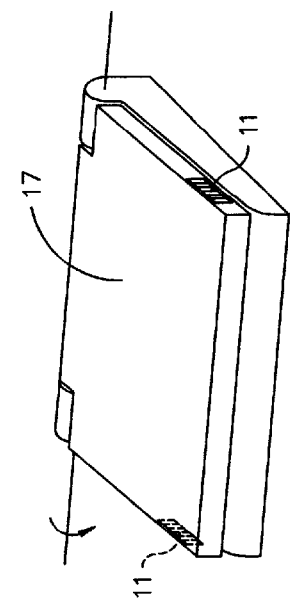
FIG. 4 is a perspective view of the prior art notebook computer shown in FIG. 2 with the display housing shown in the closed position.

Certain terminology is used in the following description for convenience only and is not limiting. The words "right," "left," "lower" and "upper" designate directions in the drawings to which reference is made. The words "inwardly" and "outwardly" refer to directions toward and away from, respectively, the geometric center of the self-latching hinge and/or portable computer and designated parts thereof. The terminology includes the words above specifically mentioned, derivatives thereof and words of similar import.

Figure 5:
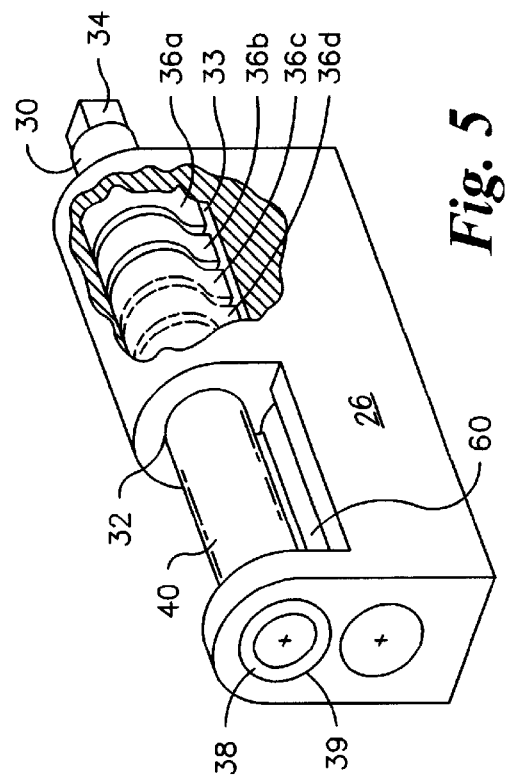
FIG. 5 is a perspective view, partially broken away, of a self-latching hinge in accordance with a preferred embodiment of the present invention.
Figure 13A:
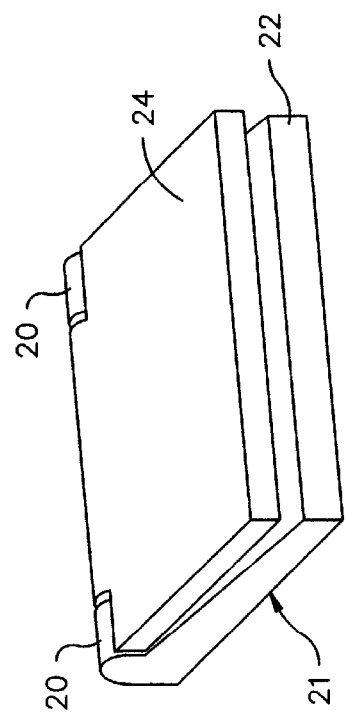
FIGS. 13a–13c are perspective views of a notebook computer having at least one self-latching hinge in accordance with the present invention which correspond to FIGS. 12a–12c, respectively.

Referring to the drawings, wherein like numerals indicate like elements throughout, there is shown in FIG. 5 a self-latching hinge 20 for rotatably coupling a first member 22, such as processor housing 22 of a portable computer 21 shown in FIG. 13a, to a second member 24, such as a display housing 24 of the portable computer 21 also shown in FIG. 13a. While the self-latching hinge is preferably used in conjunction with portable computers, such as laptop, palmtop and notebook computers, it will be recognized by those skilled in the art from the present disclosure that it can be used with various other items which are rotatably fastened together, such as kitchen cabinetry.

Referring to FIGS. 5–8, the self-latching hinge 20 includes a hinge housing 26 which is connected to one of the first and second members 22, 24. Preferably, the hinge housing 26 is mounted to the first member, such as the processor housing 22. The hinge housing 26 can be mounted by various means such as mechanical fasteners, adhesives, or interlocking features located on the processor housing 22 and the hinge housing 26. Alternatively, the hinge housing may be formed integrally with the processor housing 22, if desired.

A shaft 30 is rotatably disposed in the hinge housing 26. Preferably, the shaft 30 is located in a complementary sized bore 32 in the hinge housing 26 along an axis 31. The shaft 30 is connected to the other of the first and second members 22, 24, and preferably is connected to the display housing 24, as shown in FIG. 13a. Preferably, the shaft 30 includes flats 34 which are engaged by the second member 24 such that the shaft 30 moves in conjunction with the second member 24. However, it will be recognized by those skilled in the art from the present disclosure that other means for attaching the second member 24 to the shaft 30 can be utilized, such as a screw or other keyed feature on the shaft engaging with the second member (not shown).

Figure 7:
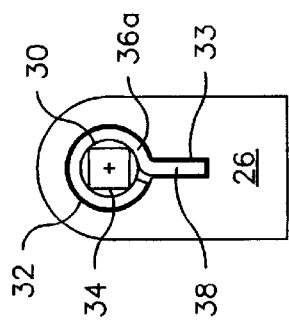
FIG. 7 is a right side elevational view of the self-latching hinge shown in FIG. 6 taken along lines 7—7 in FIG. 6.
Figure 6:
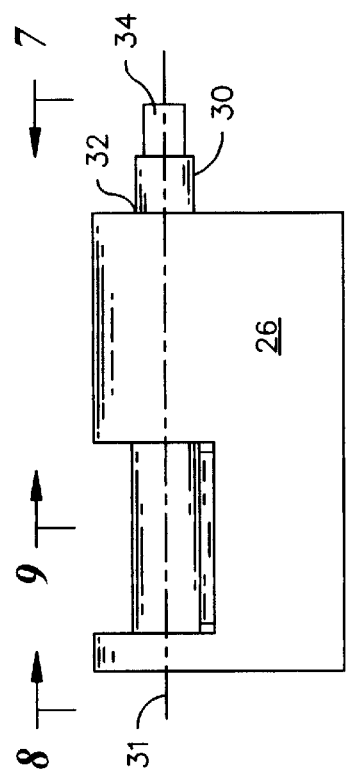
FIG. 6 is a front elevational view of the self-latching hinge shown in FIG. 5.

Referring now to FIGS. 5 and 7, preferably a frictional torque applying element 36a is located in the hinge housing 26 and applies a frictional torque to the shaft 30 as it rotates. Preferably, four frictional torque applying elements 36a–d are provided and are located around the shaft 30 in the bore 32 in the housing. The frictional torque applying elements 36a–d comprise at least one C-shaped spring element secured to the housing 26. Preferably, the C-shaped spring element has an internal surface with a generally cylindrical opening. The shaft 30 is located in the opening of the frictional torque applying elements 36a–d. Preferably, a tail portion 38 is connected to each C-shaped spring element portion for preventing rotation of each frictional torque applying element 36a–d within the bore 32. As shown in detail in FIG. 7, preferably the bore 32 includes a downwardly projecting slot portion 33 which receives the tails 38 of the frictional torque applying elements 36a–d.

The frictional torque applying elements 36a–d are preferably formed from flat spring steel. However, it will be recognized by those skilled in the art from the present disclosure that the frictional torque applying elements 36a–36d can be manufactured from other materials, such as stainless steel, other suitable metals, or polymeric materials, such as reinforced engineering plastics. While in the preferred embodiment four frictional torque applying elements 36a–d are used, it will be recognized by those skilled in the art that more or less frictional torque applying elements 36a–d may be used, if desired in order to apply a greater or lesser frictional torque, as needed.

It will also be recognized by those skilled in the art from the present disclosure that the frictional elements 36a–d may be arranged so as to produced equal frictional torque in both directions of rotation. This is accomplished by alternating the orientation of the frictional elements 36a–36d, as is understood by those skilled in the art. Different frictional torques can be created on the shaft 30 depending on the direction of rotation by having a majority or all of the friction elements oriented in the same direction, with greater frictional torque being produced in the self-braking direction of rotation (counterclockwise in FIG. 7 based on the orientation of the friction element 36a) as compared to when the shaft 30 is rotated in the opposite direction.

Referring now to FIGS. 5, 6, 9 and 11, a cam 40 is located on the shaft 30. The cam 40 is generally cylindrical in shape and rotates about the axis 31 with the shaft 30. As shown in detail in FIG. 11, preferably the cam 40 has an outer surface 42 defined by radii which vary circumferentially to a point of maximum outer surface displacement 44. The point of maximum outer surface displacement 44 is preferably located at a specified angle of rotation between the first and second members 22, 24, which are preferably the processor or display housings 22, 24, such that the first and second members 22, 24 are held in a closed position, as explained in detail below.

Figure 11:
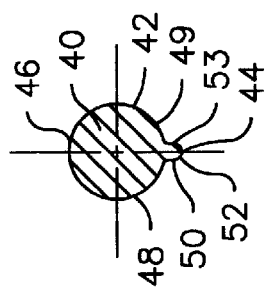
FIG. 11 is a cross-sectional view of the cam located on the shaft of the self-latching hinge shown in FIG. 5.
Figure 10:
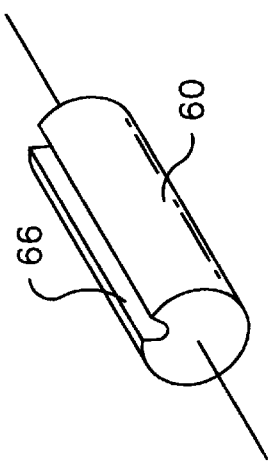
FIG. 10 is a perspective view of the rotatable roller used in the self-latching hinge shown in FIG. 5.
Figure 9:
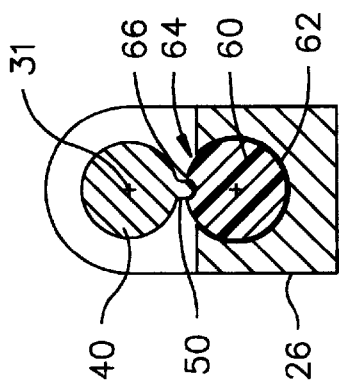
FIG. 9 is a cross-sectional view of the self-latching hinge shown in FIG. 6 taken along lines 9—9 in FIG. 6.

Referring to FIG. 11, the outer cylindrical surface 42 of the cam 40 varies in radius from the rotational axis 31 such that the upper 180° segment 46 has a generally constant radius while the lower 180° segment contains tapered cylindrical surfaces 48, 49 that continue to an extended semi-cylindrical section 50. The extended semi-cylindrical section 50 preferably also includes tapered cylindrical surfaces 52, 53 which extend to the point of maximum outer surface displacement 44. However, it will be recognized by those skilled in the art from the present disclosure that the configuration of the cam 40 can be varied to any desired shape which includes an area of maximum protrusion which is adapted to be located at a specified angle of rotation between the first and second members 22, 24 such that the first and second members 22, 24 are held in a closed position, as explained below.

Preferably, the cam 40 and the shaft 30 are made as a unitary structure and are machined from steel or stainless steel. However, it will recognized by those skilled in the art from the present disclosure that other suitable metallic or polymeric materials having the desired strength can be used.

Figure 8:
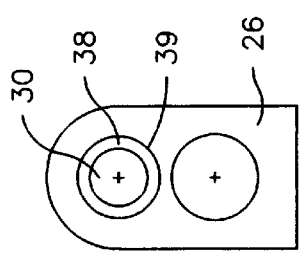
FIG. 8 is a left side elevational view of the self-latching hinge shown in FIG. 6 taken along lines 8—8 in FIG. 6.

As shown in FIG. 8, preferably the end of the shaft 30 opposite to the friction elements 36a–d is supported by a bushing 38 pressed into an opening 39 in an end support of the hinge housing 26. This prevents the shaft 30 from being deflected as the self-latching hinge 20 is used.

Referring to FIGS. 5, 6, 9 and 10, a rotatable roller 60 is located in the housing 26 adjacent to the cam 40 such that as the shaft 30 is rotated the cam 40 contacts and rotates the roller 60. Preferably, the roller 60 is located in a cavity 62 in the housing 26. The cavity 62 has an opening 64 adjacent to the cam 40. Contact between the roller 60 and the cam 40 at a specified angle of rotation causes interference between the roller 60 and the cam 40 to create an increased latching torque which must be overcome for movement of the shaft 30.

In the preferred embodiment, the roller 60 is made of a polymeric material which deflects upon interference between the roller 60 and the cam 40. The roller 60 preferably also includes a recess 66 which is located in a complementary position to the point of maximum outer surface displacement 44 on the outer surface 42 of the cam 40.

Preferably, the cavity 62 has a longitudinal axis 68 which coincides with the longitudinal axis of the roller 60, and the cavity 62 is sized to allow the roller 60 to rotate within the cavity 62. Preferably, the longitudinal axis 68 of the cavity 62 is generally parallel to the axis 31 of the shaft 30.

Figure 12C:
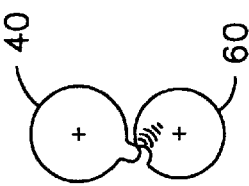
FIGS. 12a–12c are a series of schematic cross-sectional representations of the cam and roller used in the self-latching hinge shown in FIG. 5 illustrating the movement of the cam and the rotatable roller during closing and latching.
Figure 12B:
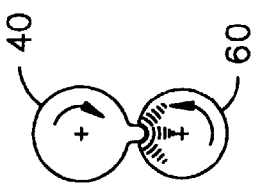
Figure 12A:
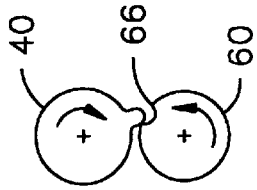

Referring now to FIGS. 12a–12c, the interaction of the cam 40 and the roller 60 during latching is shown. As shown in FIG. 12a, the cam 40 is rotated without contacting the roller 40 to the position shown, where the cam 40 just engages by the roller 60. Preferably, the cam 40 is aligned with the recess 66. As the second member 24 is closed relative to the first member 22, the extended cylindrical section 50 which includes the point of maximum outer surface displacement 44 engages the roller 60 and drives the roller 60 in a counterclockwise direction in the cylindrical cavity 62. The roller 60 and the cam 40 are sized such that the extended cylindrical section 50 with the maximum outer surface displacement 44 on the cam 40 rotates into the recess 66 in the roller 60, as shown in FIG. 12b, and compresses the roller 60 in the area of the recess 66 to a point of maximum deflection at the position shown in FIG. 12b. As the cam 40 continues moving in the clockwise direction for the latched position shown in FIG. 12c, the pressure exerted by the extended cylindrical section 50 on the roller 60 is relieved and the roller 60 is allowed to expand in the contact area as the second member 24, preferably the display 24, comes to a closed position with respect to the first member 22, which is preferably the processor housing 22. Only a portion of the tapered cylindrical surface 53 remains in contact with the roller 60 such that the surface pressure exerted by the cam 40 on the roller 60 is less than the maximum allowable load for elastic deflection of the polymeric material used to make the roller 60. Thus, even if the self-latching hinge is closed for an extended period of time, no permanent deformation occurs on the outside surface of the roller 60.

In order to open the self-latching hinge 20, the cam 40 is rotated in the opposite (counterclockwise) direction forcing the clockwise rotation of the roller 60 such that the recess 66 returns to the angular position shown in FIG. 12a. Once the cam 40 has been rotated sufficiently, it no longer is engaged with the roller 60 and the latching torque drops to zero. As shown, the latching action of the self-latching hinge 20 is only active during the final 30–45° of closure of the self-latching hinge 20.

FIGS. 13a, b and c correspond generally to FIGS. 12a, b and c and show the display housing 24 of the portable computer 21 being closed against the processor housing 22 with the self-latching hinge 20 acting as a latch for holding the display housing 24 in a closed position relative to the processor housing 22.

Figure 14:
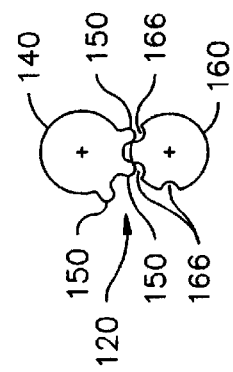
FIG. 14 is a schematic cross-sectional view similar to FIG. 12a of a second embodiment of a self-latching hinge in accordance with the present invention.

Referring now to FIG. 14, a second embodiment of a self-latching hinge 120 is illustrated schematically. The second embodiment 120 is identical to the first embodiment except for the configuration of the cam 140 and the roller 160. In the second embodiment of the self-latching hinge 120, the cam 140 includes a plurality of projections 150 and the roller 160 includes a corresponding number of parallel recesses 166. As the cam 140 is rotated relative to the roller 160, the projections 150 engage the corresponding recesses 166 in the roller 160 and cause a multi-step latching which can hold the self-latching hinge in a plurality of "latched" positions where the projections 150 contact the roller 160 but no projection is in a position where it applies a maximum force against a recess 166 in the roller 160, similar to the position shown in FIG. 12b.

Figure 13B:
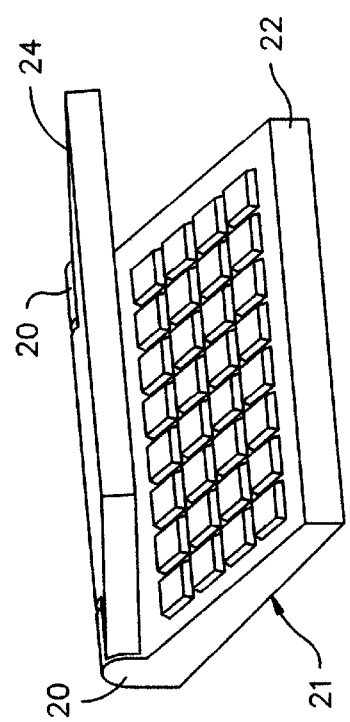
Figure 13C:
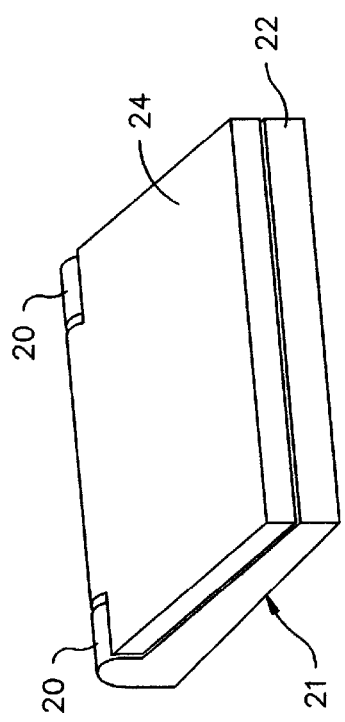

Preferably, as shown in FIGS. 13a–13c, the self-latching hinges of the present invention 20, 120 are used in conjunction with the portable computer 21 for holding the display housing 24 in a closed position relative to the processor housing 22. This eliminates the need for a separate latching element, as in the prior art portable computers shown in FIGS. 1–4 which allows the display housing 24 to be made more compactly or allows a larger display to be used.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A self-latching hinge for rotatably coupling a first member to a second member, said hinge comprising:

a hinge housing for being connected to one of the first and second members;

a shaft rotatably disposed in the hinge housing, the shaft for being connected to the other of the first and second members;

a cam located on the shaft, the cam includes a projection; and a rotatable roller having a recess, the roller being located adjacent to the cam which contacts the cam such that as the shaft is rotated, the cam contacts and rotates the roller, and contact between the roller and the cam at a specified angle of rotation causes interference between the roller and the projection on the cam by engagement of the projection into the recess to create an increased latching torque which must be overcome for movement of the shaft.

2. The hinge of claim 1 wherein the roller is made of an elastomeric material which deflects upon interference between the roller and the projection on the cam.

3. The hinge of claim 1 wherein the cam and the shaft are made as a unitary structure.

4. The hinge of claim 1 wherein the roller is located in a cavity in the housing, and the cavity has an opening adjacent to the cam.

5. The hinge of claim 1 wherein the cam includes a plurality of projections.

6. A self-latching hinge for rotatable coupling a first member to a second member, said hinge comprising:
- a hinge housing for being connected to one of the first and second members;
- a shaft rotatably disposed in the hinge housing, the shaft for being connected to the other of the first and second members;
- a cam located on the shaft;
- a rotatable roller located adjacent to the cam which contacts the cam such that as the shaft is rotated, the cam contacts and rotates the roller, and contact between the roller and the cam at a specified angle of rotation causes interference between the roller and the cam to create an increased latching torque which must be overcome for movement of the shaft; and
- a frictional torque applying element located in the hinge housing which applies a frictional torque to the shaft as it is rotated.

7. The hinge of claim 6 wherein the frictional torque applying element comprises at least one C-shaped spring element secured to the housing, the C-shaped spring element having an internal surface with a generally cylindrical opening, the shaft being located in the opening of the spring element.

8. A self-latching hinge for rotatable coupling a first member to a second member, said hinge comprising:
- a hinge housing for being connected to one of the first and second members;
- a shaft rotatable disposed in the hinge housing, the shaft for being connected to the other of the first and second members;
- a cam located on the shaft; and
- a rotatable roller located adjacent to the cam which contacts the cam such that as the shaft is rotated, the cam contacts and rotates the roller, and contact between the roller and the cam at a specified angle of rotation causes interference between the roller and the cam to create an increased latching torque which must be overcome for movement of the shaft;
- wherein the cam is generally cylindrical and has an outer surface defined by radii which vary circumferentially to a point of maximum outer surface displacement from the axis, the point of maximum outer surface displacement being located at the specified angle of rotation between the first and second members such that the first and second members are forced to a closed position.

9. The hinge of claim 8 further comprising a recess in the roller located in a complementary position to the point of maximum outer surface displacement on the outer surface of the cam.

10. A self-latching hinge for rotatably coupling a first member to a second member, said hinge comprising:
- a hinge housing for being connected to the first member;
- a shaft rotatably disposed in the hinge housing, the shaft for being connected to the second member;
- a cam located on the shaft, the cam includes an outer surface having a plurality of projections; and
- a rotatable roller having at least one recess, said roller located in the hinge housing such that as the shaft is rotated, the cam contacts and rotates the roller and contact between the roller and the cam at a specified angle of rotation causes interference between the roller and at least one of the plurality of projections on the cam by engagement of the projection into one of the at least one recesses to create an increased latching torque which must be overcome for movement of the shaft.

11. The hinge of claim 10 wherein the projections are semi-cylindrically shaped.

12. The hinge of claim 10 wherein the roller contains a plurality of recesses which correspond to the projections on the cam.

13. The hinge of claim 10 further comprising a frictional torque applying element located in the hinge housing which applies frictional torque to the shaft as it is rotated.

14. The hinge of claim 13 wherein the frictional torque applying element comprises at least one C-shaped spring element secured to the housing, the C-shaped spring element having an internal surface defining a generally cylindrical opening, the shaft being located in the opening of the spring element.

15. A portable computer comprising:
- a screen housing;
- a processor housing;
- a hinge pivotally connecting the screen housing to the processor housing, the hinge includes,
- a hinge housing connected to one of the processor housing and the screen housing;
- a shaft rotatably disposed in the hinge housing, the shaft being connected to the other of the processor housing and the screen housing;
- a frictional torque applying element located in the hinge housing for applying frictional torque to the shaft as it is rotated;
- a cam located on the shaft, the cam having a projection; and
- a rotatable roller having a recess, said roller located in the housing such that as the shaft is rotated, the cam contacts and rotates the roller, and contact between the roller and the cam at a specified angle of rotation causes interference between the roller and the cam by engagement of the projection into the recess to create an increased latching torque which must be overcome for movement of the shaft.

* * * * *